US005308201A

United States Patent [19]

Wilson et al.

[11] Patent Number: 5,308,201

[45] Date of Patent: May 3, 1994

[54] MILLING MACHINE

[75] Inventors: Wendell Wilson, Atlanta, Ga.; David M. Martinez, New Bern, N.C.

[73] Assignee: Robert Bosch GmbH, Stuttgart, Fed. Rep. of Germany

[21] Appl. No.: 975,685

[22] Filed: Nov. 12, 1992

[30] Foreign Application Priority Data

Nov. 28, 1991 [DE] Fed. Rep. of Germany ....... 9114811

[51] Int. Cl.[5] ........................ B23C 1/20; B27G 21/00; B23Q 11/08

[52] U.S. Cl. ............................... 409/134; 144/134 D; 144/251 R; 409/182

[58] Field of Search ....................... 409/134, 182, 181; 408/710; 144/251 R, 251 A, 134 D, 136 C; D8/67

[56] References Cited

U.S. PATENT DOCUMENTS

D. 281,218 11/1985 Barrett .................................. D8/67
2,399,707 5/1946 Salvatore ............................ 409/134
2,750,971 6/1956 Collette et al. ................. 144/251 A
2,785,716 3/1957 Lutton ............................ 144/251 A
2,898,956 8/1959 Zern .............................. 144/134 D
3,212,541 10/1965 Burrows et al. ................ 144/134 D
3,587,387 6/1971 Burrows ............................. 409/182
3,786,846 1/1974 Mehring ......................... 144/251 A
3,791,260 2/1974 Ambler et al. ............. 144/134 D X
4,640,324 2/1987 Lounds ........................... 409/182 X
4,674,548 6/1987 Mills et al. ...................... 409/182 X

FOREIGN PATENT DOCUMENTS 923459 7/1949 Fed. Rep. of Germany ... 144/251 R
3303734 8/1984 Fed. Rep. of Germany .
2435323 5/1980 France ............................... 409/134

*Primary Examiner*—William Briggs
*Attorney, Agent, or Firm*—Michael J. Striker

[57] ABSTRACT

A milling machine, in particular a hand-guided router has a foot plate to be placed on a workpiece, a motor housing having a lower side provided with a tool receptacle for a milling tool and displaceable relative to the foot plate, a protective shield arranged between the foot plate and the motor housing before the milling tool to hold back chips from an operator. The protective shield is foldably mounted on the foot plate so as to facilitate a tool exchange.

10 Claims, 2 Drawing Sheets

FIG. 2
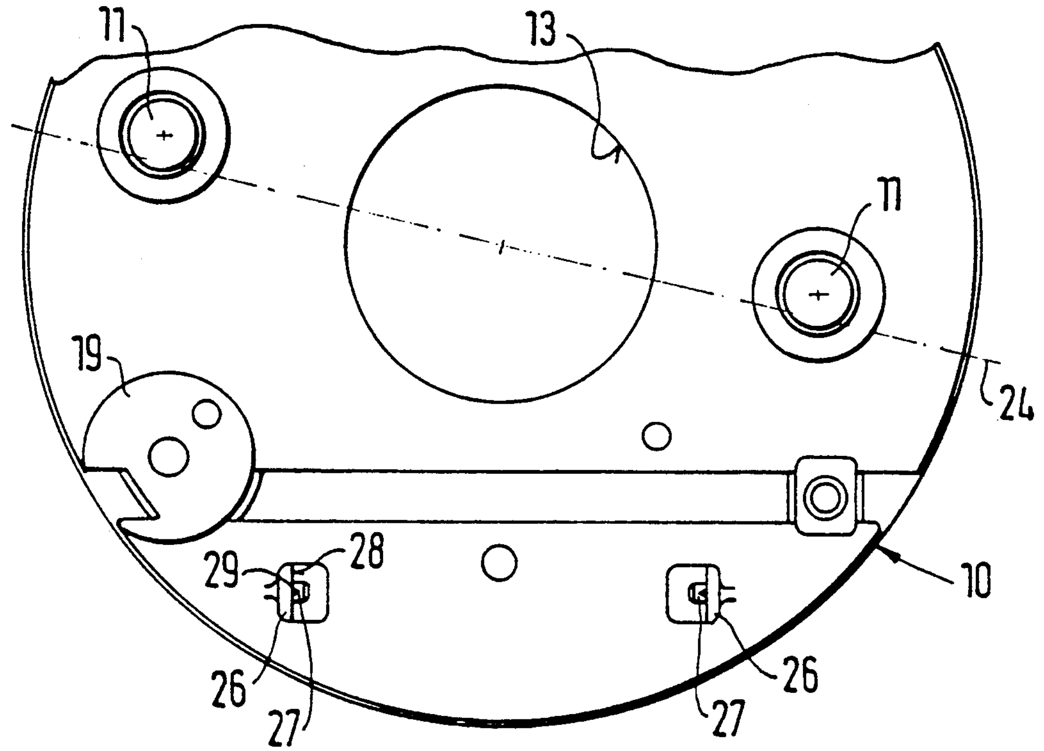
FIG. 4
FIG. 3
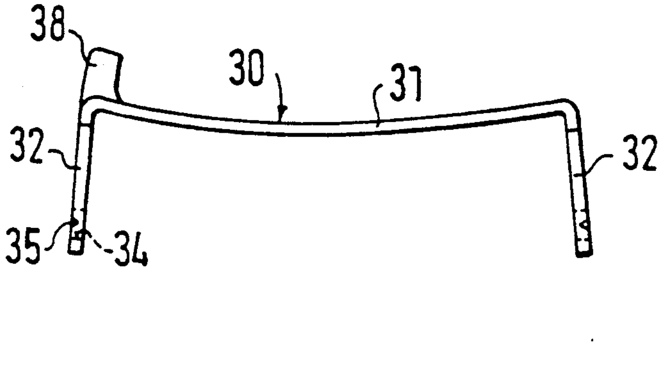
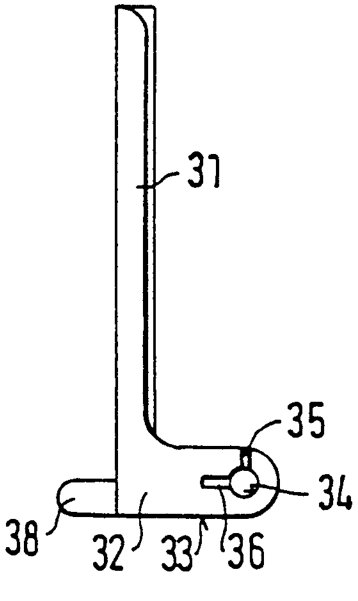

MILLING MACHINE

BACKGROUND OF THE INVENTION

The present invention relates to a milling machine.

More particularly, it relates to a milling machine which has a foot plate to be placed on a workpiece, and a motor housing provided on its lower side with a tool receptacle for a milling tool and displaceable relative to the foot plate along guiding columns, with a transparent protective shield arranged before the milling tool between the foot plate and the motor housing.

Milling machines of the above mentioned general type are known in the art. Such milling machines in which the protective shield is fixedly connected with the foot plate are commercially available. Since the protective shield blocks the accessibility to the milling tool, a tool exchange in these machines is quite difficult.

SUMMARY OF THE INVENTION

Accordingly, it is an object of the present invention to provide a milling machine which avoids the disadvantages of the prior art.

More particularly it is an object of the present invention to provide a milling machine in which the tool exchange is easily possible by passage between the motor housing and the foot plate without getting rid of the cheap diverter during working with the mill.

In keeping with these objects and with others which will become apparent hereinafter, one feature of the present invention resides, briefly stated, in a milling machine of the above mentioned type in which the protective shield is mounted in a folding manner on the foot plate, in order to facilitate the tool exchange.

When the milling machine is designed in accordance with the present invention it eliminates the disadvantages of the prior art and achieves the above specified advantages.

In accordance with another advantageous feature of the present invention, the protective shield has an arm extending from its cheap diverting surface, and the arm is articulately connected with a rotary bearing of the foot plate.

A fixation of the protective shield in two rotary bearings is performed advantageously with arresting means formed as ribs or end notches on the mutually facing surfaces of the arm and the rotary bearing.

The manufacture of the machine is especially simplified by a one-piece design of the elastically springy arm and the deflector surface.

Another novel feature of the present invention is that a lever-like handle is formed on the protective shield, and therefore, the operation is facilitated.

The guiding columns are arranged on the foot plate in an asymmetrical arrangement, so that the observation of the milling tool from the open side is facilitated. For this purpose the protective shield is mounted on this side.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a foot plate of the inventive milling machine; and

FIGS. 3 and 4 are further views showing a protective shield of the inventive milling machine.

DESCRIPTION OF THE PREFERRED EMBODIMENTS

Figure 1:
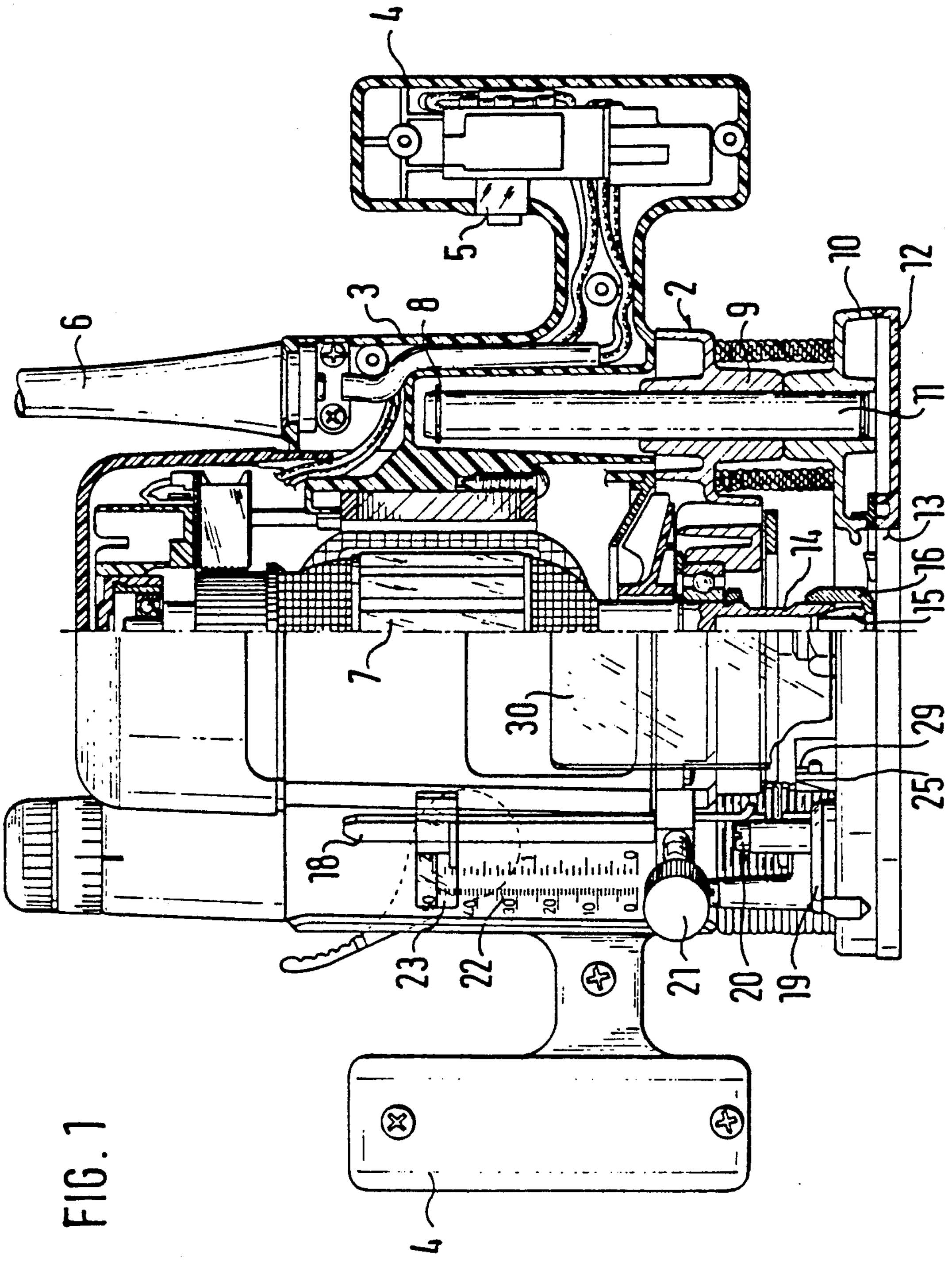
FIG. 1 is a partially sectioned view of a milling machine in accordance with the present invention.

A milling machine in accordance with the present invention, formed as a router, has a two-part motor housing including a lower part 2 composed of aluminum and an upper part 3 composed of synthetic plastic material. Two handles 4 are connected with the upper part 3 while an electrical switch 5 is accommodated in one of the handles. The switch 5 is electrically connected with a network connecting conductor 6 and a drive motor 7.

The lower part 2 of the housing is provided with vertically extending guiding pipes 9 which are guided on two vertical guiding columns 11 projecting from a foot plate 10. A spring ring 8 is arranged on the upper end of the massive guiding column 11 in a ring groove. It prevents an undesired sliding of the motor housing 2 and 3 from the guiding columns 11. The foot plate 10 has a synthetic plastic bottom 12 for protecting the workpiece to be machined. The foot plate 10 and the bottom 12 have a central opening 13. A spindle 14 driven by the motor 7 extends through the opening 13. The spindle 14 is provided with a clamping sleeve 15 which is clamped by a hexagonal nut 16.

The foot plate 10 is provided with an abutment for a bar 18 for milling depth adjustment. The abutment is formed as a rotary plate 19 having three adjustable screws 20. The rod 18 is fixed by an adjusting screw 21 inserted in a screw thread in the lower part of the motor housing. For facilitating the adjustment of the desired milling depth, a scale 22 is provided on the upper part 3 of the housing, and a displaceable slider 23 of a plexiglass with a marking line is mounted on the rod 18.

The axes of the guiding columns 11 are located both at one side of a diagonal 24 through the center point of the opening 13 as can be seen from FIG. 2. Two rotary bearings 25 are arranged or cast at the opposite side on the foot plate 10. They are composed each of a disc-shaped projection 26 provided centrally with an inwardly directed rotary pin 27. A rectilinear rib 29 extends from the rotary pin 27 back upwardly on the bearing surface 28 of the projection 26.

A protective shield 30 of plexiglass is rotatably supported on the rotary bearing 25. It has a slightly outwardly bulged transparent diverting part 31 and two lateral arms 32 formed of one piece with it, as can be seen from FIGS. 3 and 4. The diverting part 31 in an upstanding unfolded working position shown in FIG. 1 is located between the spindle 14 and the operator which holds the mill, for protecting his eyes. The arms 32 are located in this position with their lower sides 33 on the foot plate 10 and form an abutment. At their ends facing away of the diverting portion 31, the arms are provided with openings 34 . The rotary pins 27 pass through rectilinear notches 35 and 36 extending from the openings 34. The notch 35 extends so as to coincide with the rib 29 vertically upwardly with the placed protective shield 30. The other notch 36 extends substantially at a right angle relative to it in the direction of extension of the arms 32. A handle 38 is formed on the diverting part 31 at the extension of one of the arms 32.

The protective shield 30 is rotatable in the rotary bearings 25 and is foldable from its upstanding working position shown in FIG. 1 to a mounting position in which the diverting surface 31 extends substantially parallel to the foot plate 10. In this position a free passage between the foot plate 10 and the motor housing 2, 3 to the clamping sleeve 15 and the hexagonal nut 16 as well as to the milling tool from a better accessible side is possible, due to the asymmetrical arrangement of the guiding columns 11.

The protective shield 30 is fixable both in the working position and in the mounting position by arresting means 29, 35, 36. In the working position the rib 29 engages in the notch 25, while in the mounting position it engages in the notch 36. The arresting process is performed by a pretensioning between both arms 32. In FIG. 3 the protective shield is shown in a relaxed not mounted condition. The arms 32 project outwardly. In the built-in condition, the arms 32 extend parallel to one another. The material of the protective shield 30 is continuously elastic.

The arrangement is of course not limited to the shown embodiment. For example, the pin 27 of the rotary bearing 25 and the openings 34 can be arranged on another part correspondingly. Also, the arresting means 29, 35, 36 can be arranged the same way. Instead of two, also more or only one rotary bearing designed in accordance with corresponding force requirements can be provided.

It will be understood that each of the elements described above, or two or more together, may also find a useful application in other types of constructions differing from the types described above.

While the invention has been illustrated and described as embodied in a milling machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A milling machine, in particular a hand-guided router, comprising a foot plate to be placed on a workpiece; a motor housing having a lower side provided with a tool receptacle for a milling tool and displaceable relative to said foot plate; a protective shield arranged between said foot plate and said motor housing before the milling tool to hold back chips from an operator, said protective shield being foldably mounted on said foot plate so as to facilitate a tool exchange.

2. A milling machine as defined in claim 1; and further comprising guiding columns, said motor housing being displaceable along said guiding columns so as to move relative to said foot plate and being releasably fixable with at least one of said columns.

3. A milling machine as defined in claim 1, wherein said protective shield has a diverting portion and arms projecting from said diverting portion and articulately connected with said foot plate.

4. A milling machine as defined in claim 3; and further comprising rotary bearings, said arms being articulately connected with said foot plate through said rotary bearings.

5. A milling machine as defined in claim 4; and further comprising arresting means provided on said arm and said rotary bearing corresponding to one another, so as to fix said protective shield in at least two positions relative to said foot plate.

6. A milling machine as defined in claim 5, wherein said arresting means includes ribs and notches engageable with one another.

7. A milling machine as defined in claim 3, wherein said arms are connected with said diverting part in an elastically springy fashion.

8. A milling machine as defined in claim 3, wherein said arms are formed of one-piece with said diverting part.

9. A milling machine as defined in claim 3, wherein said diverting portion is provided with a handle for easy folding of said protective shield.

10. A milling machine as defined in claim 2; and further comprising an opening for passage a milling tool and having a central point, said guiding columns being arranged asymmetrically at one side of a diagonal extending through said center point of said opening, said protective shield being arranged at an opposite side.

* * * * *